US012368339B2

(12) United States Patent
Grimm et al.

(10) Patent No.: US 12,368,339 B2
(45) Date of Patent: Jul. 22, 2025

(54) CONTACT APPARATUS OF A STATOR (71) Applicant: Brose Fahrzeugteile SE & Co. Kommanditgesellschaft, Wuerzburg, Wuerzburg (DE)

(72) Inventors: Marco Grimm, Unterschleissheim (DE); Stefan Wuest, Lohr am Main (DE)

(73) Assignee: Brose Fahrzeugteile SE & Co. Kommanditgesellschaft, Wuerzburg, Wuerzburg (DE)

( * ) Notice: Subject to any disclaimer, the term of this patent is extended or adjusted under 35 U.S.C. 154(b) by 316 days.

(21) Appl. No.: 17/795,051

(22) PCT Filed: Jan. 20, 2021

(86) PCT No.: PCT/EP2021/051158
§ 371 (c)(1),
(2) Date: Sep. 27, 2022

(87) PCT Pub. No.: WO2021/148446
PCT Pub. Date: Jul. 29, 2021

(65) Prior Publication Data
US 2023/0088759 A1  Mar. 23, 2023

(30) Foreign Application Priority Data

Jan. 24, 2020 (DE) .................... 10 2020 200 839.6
Feb. 28, 2020 (DE) .................... 10 2020 202 578.9
Mar. 25, 2020 (DE) .................... 10 2020 203 875.9

(51) Int. Cl.
*H02K 3/52* (2006.01)
*H02K 1/14* (2006.01)
(Continued)

(52) U.S. Cl.
CPC ............. *H02K 3/522* (2013.01); *H02K 1/146* (2013.01); *H02K 3/28* (2013.01); *H02K 3/50* (2013.01);
(Continued)

(58) Field of Classification Search
CPC .. H02K 5/00; H02K 5/04; H02K 5/16; H02K 5/161; H02K 5/17; H02K 5/173;
(Continued)

(56) References Cited

U.S. PATENT DOCUMENTS 7,786,643 B2  8/2010 Bade et al.
10,566,871 B2  2/2020 Sambuichi
(Continued)

FOREIGN PATENT DOCUMENTS

CN  109599996 A  4/2019
CN  110476329 A  11/2019
(Continued)

*Primary Examiner* — Tran N Nguyen
(74) *Attorney, Agent, or Firm* — Laurence A. Greenberg; Werner H. Stemer; Ralph E. Locher (57) ABSTRACT A contact apparatus of a stator has an annular interconnection housing which receives a number of busbars for interconnecting coil ends of a stator winding to a number of phase connections. The interconnection housing has an annularly encircling base section and a number of carrier sections that correspond to the number of phase connections. The carrier sections extend axially starting from the base section, wherein the respective phase connection has an axially extending contact section and a connecting section that runs orthogonally to the axially extending contact section. The respective phase connection is inserted into the associated carrier section in such a way that an axial movement of the contact section of the respective phase connection is blocked in the direction of the base section and is permitted in the opposite direction.

6 Claims, 4 Drawing Sheets (51) Int. Cl.
*H02K 3/28* (2006.01)
*H02K 3/50* (2006.01)
*H02K 5/22* (2006.01)
*H02K 7/14* (2006.01)
*B62D 5/04* (2006.01)

(52) U.S. Cl.
CPC ............... *H02K 5/225* (2013.01); *H02K 7/14* (2013.01); *B62D 5/04* (2013.01); *H02K 2203/09* (2013.01); *H02K 2213/06* (2013.01); *H02K 2213/12* (2013.01)

(58) Field of Classification Search
CPC ........ H02K 5/1732; H02K 5/22; H02K 5/225; H02K 5/26; H02K 7/00; H02K 7/14; H02K 3/00; H02K 3/04; H02K 3/12; H02K 3/18; H02K 3/28; H02K 3/32; H02K 3/325; H02K 3/34; H02K 3/345; H02K 3/38; H02K 3/46; H02K 3/50; H02K 3/505; H02K 3/52; H02K 3/521; H02K 3/522; B29C 45/00; B29C 45/14; B29C 45/14; B29C 45/1406; B29C 45/14065; B29C 45/144; B29C 45/1445; B29C 45/1446; B29C 45/14467; B29C 45/145; B29C 45/1459; B29C 45/16; B29C 45/167; B29C 45/1671
See application file for complete search history.

(56) References Cited

U.S. PATENT DOCUMENTS

| | | | |
|---|---|---|---|
| 10,686,344 | B2 | 6/2020 | Csoti et al. |
| 11,081,870 | B2 | 8/2021 | Ogawa et al. |
| 11,159,071 | B2 | 10/2021 | Fischer et al. |
| 11,228,220 | B2 | 1/2022 | Yoshikawa et al. |
| 11,336,145 | B2 | 5/2022 | Yamashita et al. |
| 2008/0219867 | A1 | 9/2008 | Sakata |
| 2016/0218578 | A1 | 7/2016 | Yamada et al. |
| 2018/0198344 | A1 | 7/2018 | Yuan et al. |
| 2018/0241273 | A1 | 8/2018 | Beetz et al. |
| 2019/0027992 | A1 | 1/2019 | Honda et al. |
| 2020/0274405 | A1 | 8/2020 | Conti et al. |

FOREIGN PATENT DOCUMENTS

| | | | |
|---|---|---|---|
| DE | 10128769 | A1 | 6/2002 |
| DE | 102006021354 | A1 | 11/2007 |
| DE | 102015200093 | A1 | 7/2016 |
| DE | 102016121119 | A1 | 5/2018 |
| DE | 102017216084 | A1 | 3/2019 |
| DE | 202018102652 | U1 * | 8/2019 |
| DE | 112018001134 | T5 | 11/2019 |
| EP | 2913907 | A1 | 9/2015 |
| EP | 3396815 | A1 | 10/2018 |
| JP | 2019170123 | A | 10/2019 |
| KR | 101897540 | B1 | 9/2018 |
| WO | WO2018180447 | A * | 10/2018 |
| WO | 2019064877 | A1 | 4/2019 |

* cited by examiner

CONTACT APPARATUS OF A STATOR

FIELD AND BACKGROUND OF THE INVENTION

The invention relates to a contact apparatus of a stator. Furthermore, the invention relates to a stator of an electric motor, in particular an electronically commutated steering motor of a motor vehicle, and to an electric motor with a stator of this type.

Nowadays, motor vehicles usually have a number of adjustable parts, for example a steering system, a seat adjustment means, an actuable lock, a window regulator, an adjustable sunroof, which can be adjusted by means of a respective associated electric motor drive and/or can be moved between different adjustment positions.

An electric motor which is, in particular, brushless as an electric three-phase machine as a rule has a stator with a number of stator teeth which are arranged, for example, in a star-shaped manner and support an electric rotary field or stator winding in the form of individual coils which for their part are wound from an insulated wire. The coils are assigned with their coil ends (winding wire ends) to individual strands of phases, and are interconnected among one another in a predefined way, and are routed to phase connectors for energizing the rotary field winding.

In the case of a brushless electric motor as a three-phase, electronically commutated rotary electric machine, the stator has three phases and therefore at least three phase conductors or phase windings which are loaded in each case in a phase-shifted manner with electric current, in order to generate a magnetic rotary field, in which a rotor or armature which is usually provided with permanent magnets rotates. The phase ends of the phase windings are routed to a motor electronics system in order to actuate the electric motor. The coils of the rotary field winding are interconnected here in a star connection or in a delta connection and are electrically contacted to the three phase connectors.

In order to guide and interconnect the coil ends, contact apparatuses as interconnection systems or switching units are customary which are placed on the end side onto the stator or onto a stator stack. Contact apparatuses of this type serve, in particular, to connect the coil ends of the winding wire portions, which form the coil windings, in an electrically conducting manner, with the result that individual coil ends are connected electrically to one another (short-circuited) and therefore the coil or phase windings can be energized in series.

Contact apparatuses of this type frequently have a number of integrated or overmolded strip conductors or conductor rails as connecting conductors for connecting or contacting the coil ends. During the assembly of the electric motor or stator, the coil ends are contacted with the conductor rails, with the result that coil windings which are assigned to a common phase are connected to one another via the contact apparatus. The contacting of the coil ends with the conductor rails as a rule takes place by means of an integrally joined connection, for example by means of soldering or welding, in particular laser welding.

DE 10 2016 121 119 A1 has disclosed a busbar unit for an electric motor which has a stator with a number of coils. The busbar unit which is provided on an end side of the stator has an annular busbar holder made from electrically insulating material around a central (stator) axis and a number of busbars which are connected to the coils and have in each case one axially oriented phase connector. The latter is inserted into a support portion with an (axial) slot, via which an elastically acting limb of the corresponding conductor rail is routed out of the support portion. The phase connector has a stamped-out and bent latch which is in engagement with a projection of the support portion in such a way that, although an axial movement of the phase connector in the direction of the busbar holder is allowed, an axial movement of the phase connector in the opposite direction to this is blocked.

SUMMARY OF THE INVENTION

The invention is based on the object of specifying a particularly suitable contact apparatus. The contact apparatus is preferably intended to be configured to compensate for relative movements, in particular as a consequence of operationally induced temperature change, between the phase connectors of the contact apparatus and the motor electronics system, to the energization contacts of which the phase connectors are preferably connected electrically by means of clamping contact or insulation displacement contact. An undesired release of the contacting of the phase connectors with the associated contacts of the motor electronics system, which contacting is preferably established by means of clamping contact or insulation displacement contact, is also intended to be prevented in a suitable way. Furthermore, a particularly suitable stator with a contact apparatus of this type and a particularly suitable electric motor with a stator of this type are intended to be specified.

With regard to the contact apparatus, the object is achieved according to the invention by way of the features of the independent contact apparatus claim and, with regard to the independent stator claim and with regard to the electric motor, by way of the features of the independent electric motor claim. Advantageous refinements and developments are the subject matter of the subclaims. The advantages and refinements indicated with regard to the contact apparatus can also be transferred mutatis mutandis to the stator and/or the electric motor, and vice versa.

The contact apparatus, in particular for a stator of an electric motor, has an annular interconnection housing which is preferably configured as a laminated stator core and is placed or can be placed on the end side onto a stator main body which extends along a stator axis. Furthermore, the contact apparatus has a number of conductor rails for interconnecting coil ends of a stator winding with a number of phase connectors. The interconnection housing, in which at least portions of the conductor rails are received, consists of an electrically insulating material and is preferably configured as an overmolded plastic encapsulation of the conductor rails.

The interconnection housing has a base portion which runs around in an annular manner and a number of support portions which correspond to the number of phase connectors and extend axially starting from the base portion. The support portions are suitably molded onto the base portion of the interconnection housing.

The respective phase connector hays an axially extending contact portion and a tab-like or cantilever-like connecting portion which runs orthogonally with respect to the former. In relation to the circumferential direction of the contact apparatus or its interconnection housing, the width of the contact portion is expediently greater than the width of the connecting portion of the respective phase connector. In other words, the cross-sectional area of the contact portion is expediently greater than that of the connecting portion. The contact portion of the phase connectors is particularly preferably configured as an insulation displacement contact or has a contact of this type on the free end side.

The respective phase connector is inserted into the associated support portion in such a way that an axial movement of the contact portion of the respective phase connector is blocked in the direction of the base portion and is allowed in the opposite direction.

This achieves a situation where relative movements, for example as a consequence of operationally induced temperature change, between the phase connectors of the contact apparatus and the motor electronics system are compensated for. This is particularly advantageous if the phase connectors are connected to corresponding counter-contacts of the motor electronics system, preferably by means of clamping contact or insulation displacement contact. In addition, an undesired release of the contact connection following the establishment of this insulation displacement connection is reliably prevented.

In one advantageous refinement, the support portion has an axial longitudinal slot which is delimited on both sides by portion edges which reach in regions around the contact portion of the respective phase connector. The connecting portion of the respective phase connector is routed out of the support section via this longitudinal slot. In other words, the contact portion of the phase connector is seated in the support portion displaceably, in particular in one of the axial directions, whereas the connecting portion is routed out of the support section via the longitudinal slot at the base of the support section, that is to say at the transition to the base portion of the interconnection housing. Here, the connecting portion of the respective phase connector bears against the base portion in a suitable way. As a result, an axial movement of the phase connector of that phase connector which is received into the support portion by way of the contact portion is prevented in the direction toward the base portion of the interconnection housing of the contact apparatus.

In a further advantageous refinement, the conductor rail which is to be connected to the phase connector has a joining end which reaches through a corresponding cutout of a connecting section of the phase connector. The conductor rail which is to be connected to the phase connector expediently has a joining end (fixing end) which reaches through the corresponding cutout of the connecting portion of the phase connector.

The joining end of the conductor rail is deformed or is shaped in a suitable way in the connection (joining connection) to the phase connector with the formation of a fixing head which is, for example, mushroom-shaped and covers the cutout at least in regions. This connection is particularly preferably produced as a welded connection, expediently by means of laser welding.

The stator according to the invention is suitable and configured for an electric motor. The stator has a stator stack with a number of radially directed stator teeth which are provided with coils of a multiphase stator winding. Each coil has a first and a second coil end which are oriented along an axial direction. An above-described contact apparatus is placed onto the end side of the stator stack, by means of which contact apparatus the coil ends of the coils are interconnected to form phase strands or motor phases, and are contacted with phase connectors. The contact apparatus substantially simplifies the contacting and interconnection of the stator, with the result that a particularly suitable, inexpensive stator which can be produced simply is realised.

In one preferred application, the above-described stator is part of an electric motor of a motor vehicle. The electric motor according to the invention is preferably a steering motor here, for example including a gear mechanism, for the steering system of the motor vehicle.

In the following text, exemplary embodiments of the invention are explained in greater detail on the basis of the drawing.

DETAILED DESCRIPTION OF THE INVENTION

Parts and dimensions which correspond to one another are always provided with the same designations in all the figures.

Figure 1:
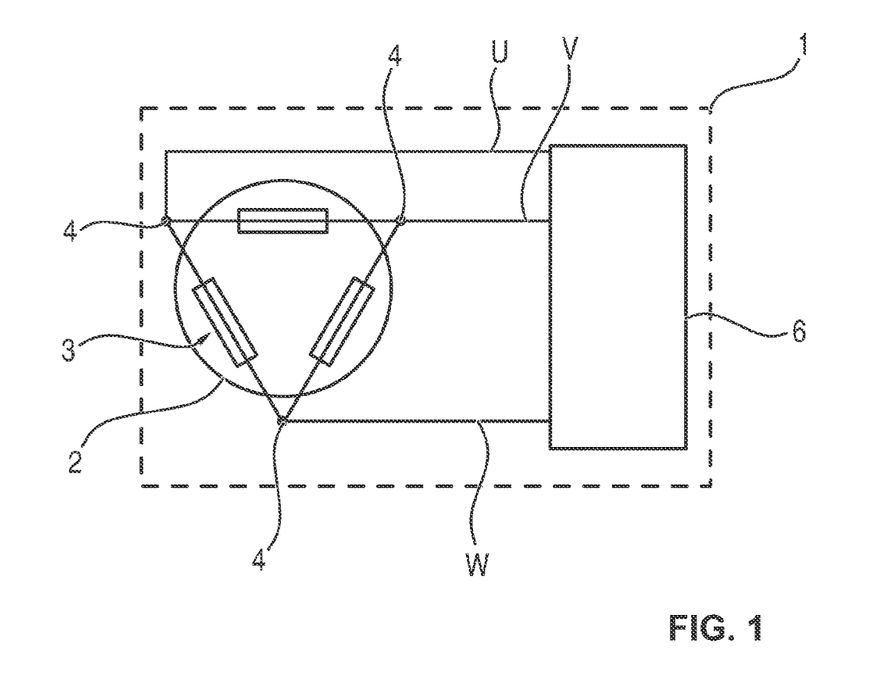
FIG. 1 shows a diagrammatic and simplified illustration of an electric motor of a motor vehicle.
Figure 2:
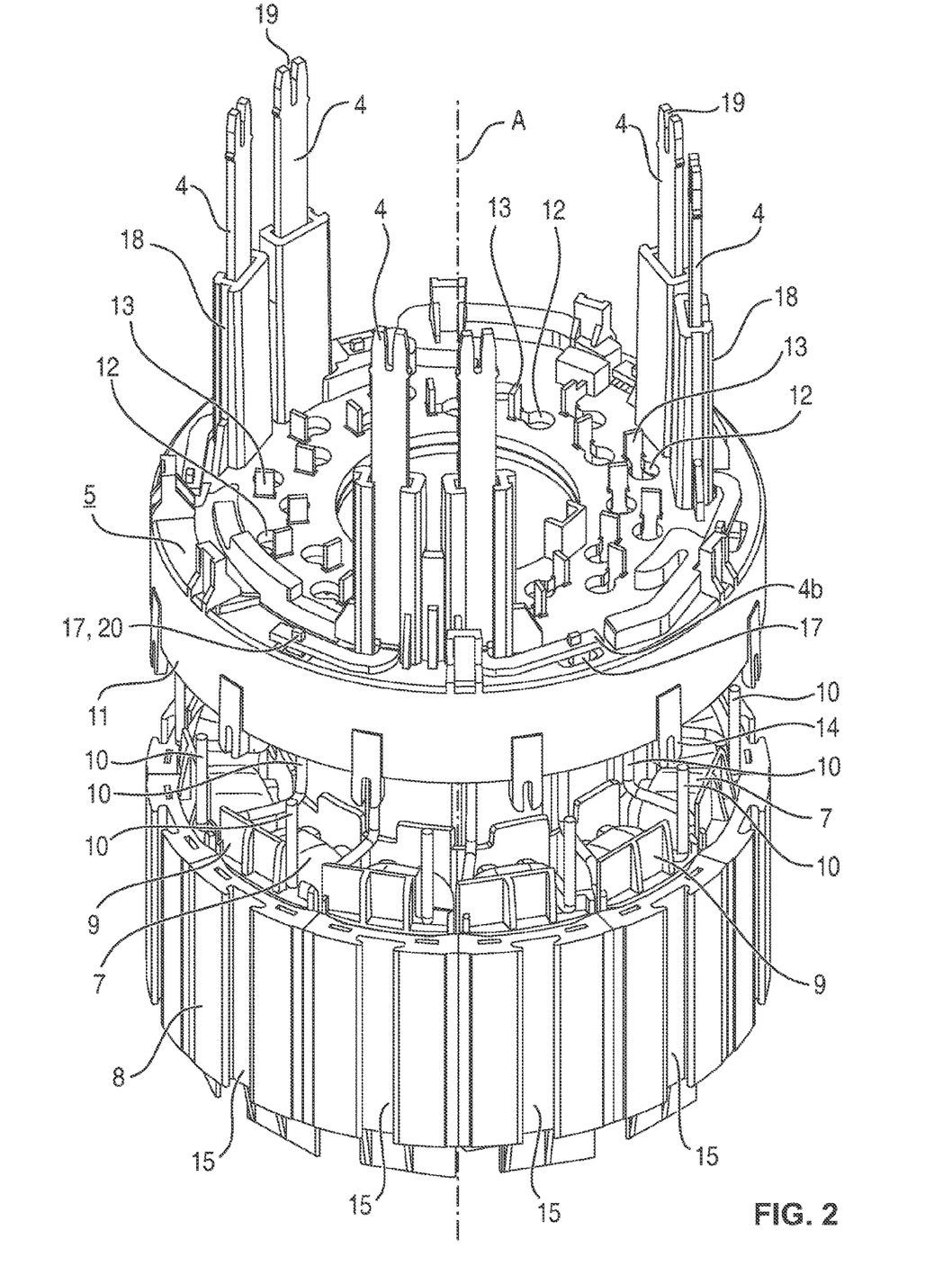
FIG. 2 shows a perspective illustration of a stator and a contact apparatus which is placed onto it on the end side with a interconnection housing and with phase connectors and contact tabs of conductor rails which protrude out of it.
Figure 3:
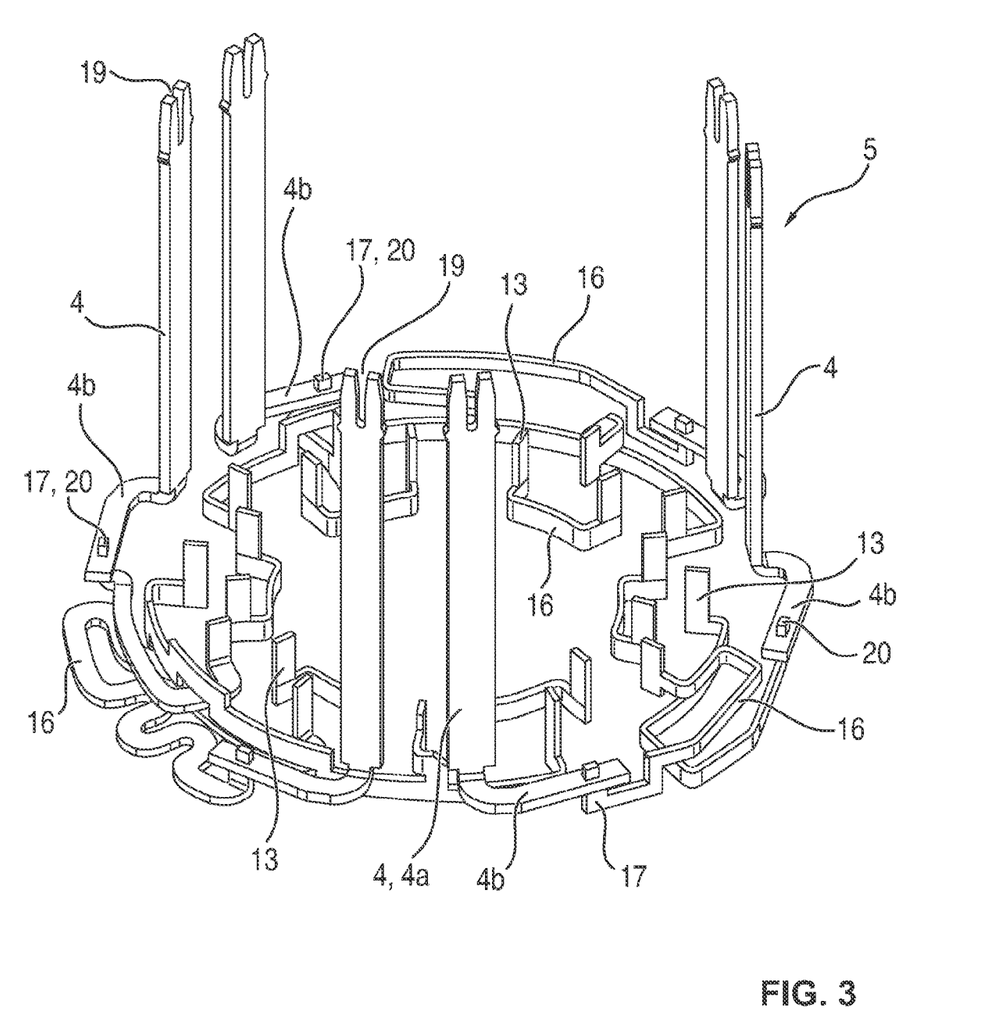
FIG. 3 shows a perspective illustration of the contact apparatus without interconnection housing and with joining connections between joining ends of individual conductor rails and connecting portions of the phase connectors.
Figure 4:
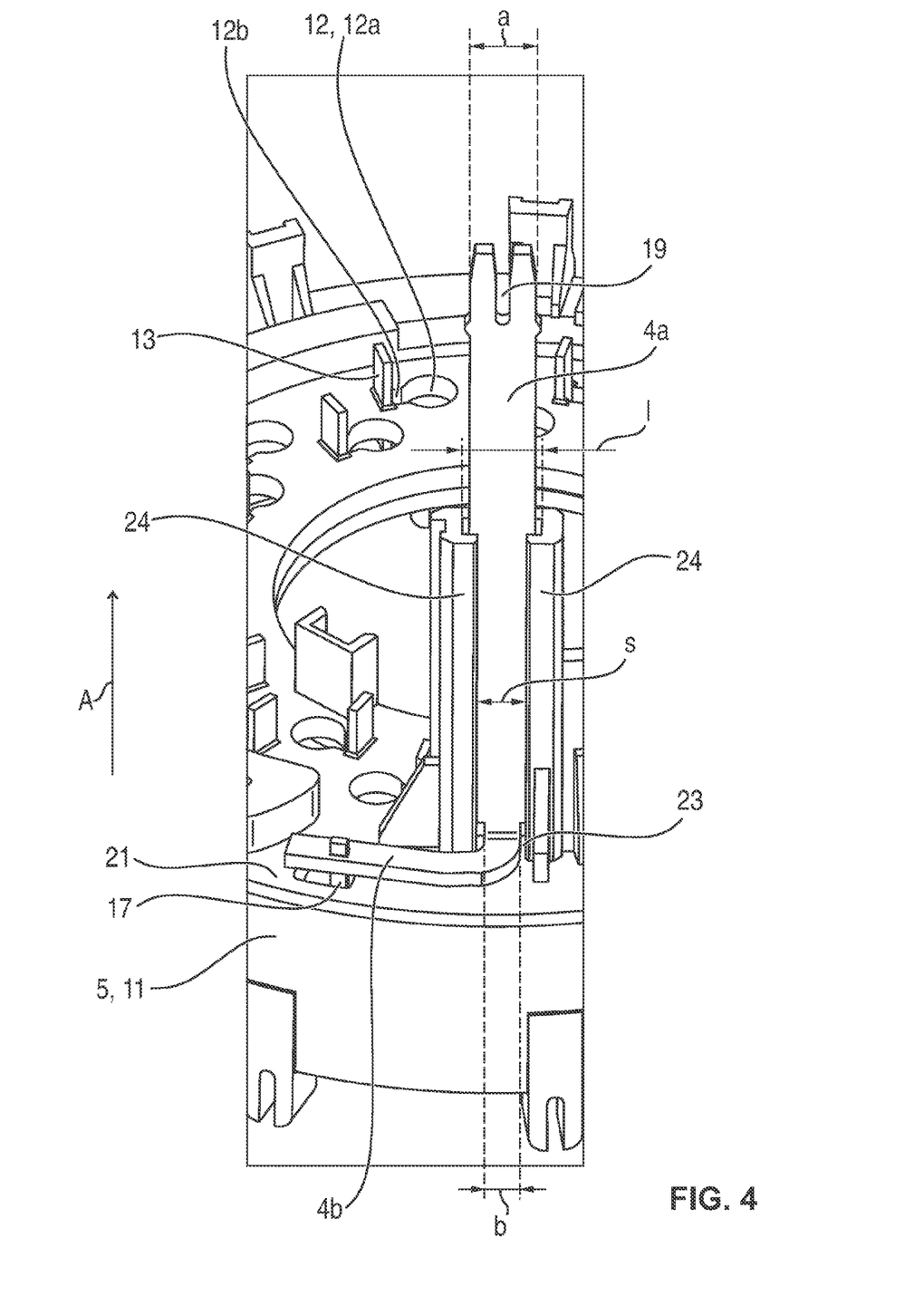
FIG. 4 shows a perspective illustration of a detail of the contact apparatus in the region of one of the phase connectors.

FIG. 1 shows a diagrammatic and simplified illustration of an electric motor 1 for use in a motor vehicle. The electric motor 1 has a stator 2 with a multiphase rotary field or stator winding 3 which is connected to a motor electronics system 6 for energization by means of phase connectors 4 (also called phase contacts in the following text) of a contact apparatus 5 (FIGS. 2 to 4). In the energized state, the stator winding 3 generates a magnetic rotary field which drives a rotor (not shown in greater detail) of the electric motor 1. The electric motor 1 is, in particular, an electronically commutated steering motor of a motor vehicle.

In the exemplary embodiment which is shown, the stator winding 3 is, in particular, of three-phase configuration with three (motor) phases U, V, W. Each phase U, V, W is formed from a phase winding which is formed substantially by way of an interconnection of in each case at least one coil (coil winding) 7 of the stator winding 3. In this exemplary embodiment, the phases U, V, W are interconnected to one another in a delta connection.

FIG. 2 shows a perspective view of the contact apparatus or switching unit 5 for the stator 2. In the assembled state, the contact apparatus 5 is placed on the end side onto the stator 2 or onto its stator main body 8 which is configured as a stator stack and extends along the stator axis A and therefore in the axial direction (axially). This or the stator stack of the stator 2 comprises, for example, twelve inwardly directed stator teeth, to which the stator winding or rotary field winding 3 of the electric motor 1 is attached.

In the exemplary embodiment, the coils 7 are wound onto insulating winding supports or coil supports 9 and are placed with the latter onto the stator teeth of the stator main body 8. Here, each of the frame-like winding supports 9 supports a coil 7 as part of the stator winding 3. The coils 7 have in each case two axially directed coil ends 10. The coils 7 and the coil ends 10 are provided merely by way of example with designations in FIG. 2.

The coil ends 10 of the coils 7 are interconnected by means of the contact apparatus 5 which is placed onto the stator 2 on the end side to form the (three-phase) stator or rotary field winding 3 in this exemplary embodiment. In electric motor operation, the energized windings of the stator winding 3 generate a stator-side magnetic field which enters into an interaction with permanent magnets of a rotor, rotating about the central stator or motor axis A, of the brushless electric motor 1.

The contact apparatus 5 has a circularly annular interconnection housing 11 made from electrically insulating material. The coil ends 10 of the coils 7 are routed through radially inner, axial leadthrough openings 12 of the interconnection housing 11 and are contacted with contact tabs 13 on the upper side of the interconnection housing 1 for interconnection. The leadthrough openings 12 and contact tabs 13 are provided merely by way of example with designations in the figures.

The contact apparatus 5 is fastened or can be fastened to the stator main body 8 in a positively locking and/or non-positive manner by means of axial latching tongues 14 of the interconnection housing 11. Here, the latching tongues 14 are distributed on the outer circumference and are arranged on that (lower) side of the interconnection housing 11 which faces the stator main body 8. Here, on its outer circumference, the stator main body 8 has axially running grooves 15, into which the latching tongues 14 engage in a clamping manner for fastening purposes. The contact apparatus 5 which is arranged on the corresponding end side of the stator 2 is latched releasably or fastened by clamping to the stator main body 8.

As can be seen in conjunction with FIG. 3, the contact apparatus 5 has a number of conductor rails 16 as connecting conductors for interconnecting the coil ends 10 or their contact tabs 13 to the phase connectors 4. The interconnection housing 11, in which the conductor rails 16 are received so as to run at least in portions concentrically with respect to one another, is configured as an overmolded plastic encapsulation of the conductor rails 16. Here, the end-side contact tabs 13 of the conductor rails 16 and joining ends 17 of some of the conductor rails 16 which are provided intentionally for connection to the phase connectors 4 are accessible, that is to say are not enclosed at least in portions by the interconnection housing 11. The six phase connectors 4 in the exemplary embodiment provides three connector pairs for the phases U, V, W of the three-phase stator or rotary field winding 3 which is formed by way of the coils 7 and their interconnection. Each of the connector pairs with the three phases U, V, W forms a stator winding 3, with the result that it is redundant.

The axially directed joining ends 17 are provided as contact points for the connection to the associated phase connectors 4, and are molded in one piece, that is to say in one part or monolithically, onto the corresponding conductor rails 16. The axially directed contact tabs 13 are likewise single-piece constituent parts of the conductor rails 16 as contact points for contacting with or electrically conducting connection to the respective associated coil end 10. The contact tabs 13 are configured, in particular, as welding tabs for a welded connection, preferably for a laser welded connection, to the coil ends 10 which are, in particular, stripped. Here, the conductor rails 16 with their joining ends 17 and contact tabs 13 are configured, for example, as stamped bent parts made from a copper material.

In this embodiment, the phase connectors 4 are configured as approximately rectangular contact tabs in the form of a stamped bent part. Here, the longitudinal sides of the respective phase connector 4 are oriented in the axial direction A, the narrow side is being oriented approximately radially. The respective phase connector 4 sticks up axially on the stator end side which supports the interconnection housing 11. For support and stabilization, the phase connector 4 is seated, in the assembled joined state of the electric motor 1, in a holding receptacle (called a support portion 18 in the following text) of the interconnection housing 11 of the contact apparatus 5. The phase connectors 4 are provided as insulation displacement contacts and, to this end, are provided on the free end side with a receiving slot 19 for a respective blade contact of the motor electronics systems 6.

As can be seen comparatively clearly from FIGS. 3 and 4, the respective phase connector 4 has an axially extending contact portion 4a and a connecting portion 4b which runs orthogonally with respect to the latter and in which a preferably rectangular cutout (not denoted in greater detail) is made. The conductor rail 16 which is to be connected to the respective phase connector 4 reaches with its joining end 17 through the corresponding cutout of the connecting portion 4b of the phase connector 4. That joining end 17 of the corresponding conductor rail 16 which is to be connected to the respective phase connector 4 is configured as a cross-sectional reduction or tapered portion 20 of the conductor rails 16 at its rail end or connecting end which faces the respective phase connector 4. The joining end 17 is preferably approximately L-shaped, the vertical L-limb forming the tapered portion 20. The cross-sectional area of the tapered portion 20 is smaller here than that of the adjoining portion of the joining end 17. The joining end 17 has a smaller cross section in the region of the tapered portion 20 than the cross section of the cutout in the cantilever-like connecting portion 4b of the phase connector 4.

In the joined state which is shown, a positively locking and/or integrally joined connection 23, in particular a welded connection, expediently by means of laser welding, is produced between the joining end 17 of the conductor rail 16 and the connecting section 4b of the phase connector 4. This is carried out when the joined connection is produced and the components (conductor rails 16 and/or phase connectors 4) of the contact apparatus 5 are overmolded, that is to say the interconnection housing 11 is finished. The latter then has a preferably planar, annular base portion 21. In this state, the joining end 17 protrudes through an opening 22 in the interconnection housing 11 toward its upper side which is formed by the base portion 21. The joining end 17 or its tapered portion 20 of the conductor rail 16 is deformed in the connection (positively locking and integrally joined connection) produced by means of laser welding to the phase connector 4. These connections are accessible following the overmolding of the corresponding portions of the conductor rails 16.

The connecting portions 4b of the phase connectors 4 run in the circumferential direction or tangentially in relation to the annular base portion 21 of the connecting housing 11, whereas the joining ends 17 of the conductor rails 16 which are to be connected to the phase connectors 4 are oriented axially. In this way, the conductor rail-side joining ends 17 can reach through the phase connector-side cutouts 20.

As can be seen comparatively clearly from FIG. 4, the leadthrough openings 12 for the conductor rail-side contact tabs 13 have a keyhole-shaped geometry with a circular opening 12a for the coil ends 10 and a guide slot 12b which opens into it for routing the coil ends to the associated contact tabs 13, where the welding connection of the respective coil end 10 to the associated contact 13 takes place. The contact lugs 13 of the conductor rails 16 are positioned in a radially inner region of the interconnection housing 11 opposite the connecting portions 4b of the phase connectors 4 and their connecting points to the conductor rails 16.

FIG. 4 shows a detail from FIG. 1 in the region of one of the phase connectors 4 on a larger scale. The annular base portion 21 and the support portion 18, sticking up axially from it, of the interconnection housing 11 of the contact apparatus 5 can be seen. The phase connector 4 is seated with its axially extending contact portion 4a in the support portion 18. This has an axial longitudinal slot 23 which extends as far as the base portion 21. The support portion 18 encloses the contact portion 4a of the phase connector 4 on the circumferential side in such a way that the contact portion 4a is surrounded on the rear side and laterally and is reached around in regions by slot or portion edges 24 which flank the axial longitudinal slot on both sides.

The clear span l within the support section 18 which is closed on the circumferential side with the exception of the longitudinal slot 23 corresponds to the width a of the contact portion 4a of the phase connector 4. The width b of the lug-like or cantilever-like connecting portion 4b, running orthogonally with respect to the contact portion 4a, of the phase connector 4 is smaller than that of the contact portion 4a (a>b). In other words, the cross-sectional area of the contact portion 4a is greater than that of the connecting portion 4b. In the exemplary embodiment, in addition, the width b of the connecting portion 4b is at least slightly smaller than the slot width s of the longitudinal slot 23 of the support portion 18.

In this way, the phase connector 4 can firstly be plugged during its assembly from above with the connecting portion 4b at the front into the support section 18, whereas the connecting portion 4b is routed along and outside the longitudinal slot 23 until contact with the base portion 21. Secondly, the phase connector 4 is held securely in the support portion 18, but such that it can be displaced axially in the direction of the arrow denoted by A in FIG. 4, that is to say upward in relation to the illustration in FIG. 4. Whereas the contact portion 4a of the phase connector 4 is therefore seated in the support portion 21 such that it can be displaced in one of the axial directions A, the connecting portion 4b is routed out of the support section 18 at the base of the support section 18, that is to say at the transition to the base portion 21 of the interconnection housing 11, via the longitudinal slot 23.

In other words, the respective phase connector 4 is inserted into the associated support portion 18 in such a way that an axial movement of the contact portion 4a is blocked in the direction of the base portion 21 and is allowed in the opposite direction. As a result, relative movements, for example as a consequence of operationally induced temperature change, between the phase connectors 4 of the contact apparatus 5 and the motor electronics system 6 are to be compensated for. This is particularly advantageous if the phase connectors 4 are connected to corresponding counter-contacts (not shown) of the motor electronics system 6 by means of clamping contact or insulation displacement contact. In addition, springing back (relaxing) of the phase connectors 4 is made possible in the case of the connection of the phase connectors 4 of the contact apparatus 5 to contacts of the motor electronics system 6, which connection is produced by way of a clamping contact or insulation displacement contact, if the (axial) joining force which is active during the production of the contact connection on the phase connectors 4 and on the corresponding contacts of the motor electronics system 6 is reduced or eliminated completely, as a result of which an undesired release of the contact connection is in turn prevented reliably.

In summary, the contact apparatus 5 according to the invention of a stator 2 has a interconnection housing 11 which receives conductor rails 16 for interconnecting coil ends 10 of the stator winding 3 to phase connectors 4, the interconnection housing 11 having a base portion 21 which runs around in an annular manner and a number of support portions 18 which correspond to the number of phase connectors 4 and extend axially starting from the base portion 21, the respective phase connector 4 having an axially extending contact portion 4a and a connecting portion 4b which runs orthogonally with respect to the former, and the respective phase connector 4 being inserted into the associated support portion 18 in such a way that an axial movement of the contact portion 4a of the respective phase connector 4 is blocked in the direction of the base portion 21 and is allowed in the opposite direction.

The invention is not restricted to the above-described exemplary embodiment. Rather, other variants of the invention can also be derived herefrom by a person skilled in the art, without departing from the subject matter of the invention. In particular, furthermore, all the individual features which are described with the exemplary embodiments can also be combined with one another in another way, without departing from the subject matter of the invention.

In addition, the invention can be used not only in the specifically shown application, but rather also in a similar embodiment in the case of other motor vehicle applications such as, for example, in the case of door and tailgate systems, in the case of window regulators, in the case of vehicle locks, in the case of adjustable seat and interior compartment systems, and in the case of electric drives, controllers, sensors and the arrangement thereof in the vehicle.

LIST OF DESIGNATIONS

1 Electric motor
2 Stator
3 Stator winding
4 Phase connector/contact
4a Contact portion
4b Connecting portion
5 Contact apparatus
6 Motor electronics system
7 Coil
8 Stator main body/stack
9 Coil/winding support
10 Coil end
11 Interconnection housing
12 Leadthrough opening
12a Opening
12b Guide slot
13 Contact tab
14 Latching tongue
15 Groove
16 Conductor rail
17 Joining end
18 Support portion/retaining receptacle
19 Receiving slot
20 Tapered portion
21 Base portion
22 Opening
23 Longitudinal slot
24 Slot/portion edge a Width of the contact portion
b Width of the connecting portion
l Clear span
s Slot width
A Stator axis/axial direction
U, V, W Phase

The invention claimed is:

1. A contact apparatus for a stator having a stator main body extending along a stator axis, the contact apparatus comprising:
    an annular interconnection housing for disposing on an end side onto the stator main body;
    a plurality of phase connectors;
    a plurality of conductor rails for interconnecting coil ends of a stator winding with said plurality of said phase connectors;
    said annular interconnection housing having an annular base portion and a plurality of support portions corresponding to a number of said phase connectors and extend axially starting from said base portion;
    a respective phase connector of said phase connectors having an axially extending contact portion and a connecting portion running orthogonally with respect to said axially extending contact portion;
    said respective phase connector being inserted into an associated one of said support portions such that an axial movement of said axially extending contact portion of said respective phase connector is blocked in an axial direction toward said base portion and is allowed in an opposite direction away from said base portion;
    in relation to a circumferential direction of said annular interconnection housing, a width of said axially extending contact portion being greater than a width of said connecting portion of said respective phase connector;
    said support portions each having an axial longitudinal slot formed therein, said axial longitudinal slot being delimited on both sides by portion edges, said axially extending contact portion of said respective phase connector being reached around in regions by said portion edges of said associated one of said support portions;
    said connecting portion of said respective phase connector being guided out of a corresponding support portion of said support portions via said axial longitudinal slot;
    said connecting portion having a corresponding cutout formed therein; and
    a conductor rail of said plurality of conductor rails being connected to said respective phase connector, said conductor rail having a joining end that reaches through said corresponding cutout of said connecting portion of said respective phase connector.

2. The contact apparatus according to claim 1, wherein said support portions are molded onto said base portion of said annular interconnection housing.

3. The contact apparatus according to claim 1, wherein said connecting portion of said respective phase connector bears against said base portion of said annular interconnection housing.

4. The contact apparatus according to claim 1, wherein said axially extending contact portion of said respective phase connector is configured as a clamping contact or insulation displacement contact.

5. A stator for an electric motor, the stator comprising:
    a stator main body having a plurality of coils forming a multiphase stator winding, each of said coils having a first and a second axially oriented coil end; and
    said contact apparatus according to claim 1 disposed on an end side of said stator main body.

6. An electric motor for a motor vehicle, the electric motor comprising:
    said stator according to claim 5.

* * * * *